(12) United States Patent
Gerard et al.

(10) Patent No.: US 9,053,184 B2
(45) Date of Patent: Jun. 9, 2015

(54) ON-DEMAND GENERATION OF CORRELATED COLLECTIONS OF MASHABLE DATA FROM DISTRIBUTED, NON-HOMOGENEOUS DATA SOURCES

(75) Inventors: Scott N. Gerard, Wake Forest, NC (US); John K. Gerken, III, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/086,952

(22) Filed: Apr. 14, 2011

(65) Prior Publication Data

US 2012/0265780 A1 Oct. 18, 2012

(51) Int. Cl.
*G06F 7/00* (2006.01)
*G06F 17/30* (2006.01)

(52) U.S. Cl.
CPC .............................. *G06F 17/30864* (2013.01)

(58) Field of Classification Search
CPC .............................................. G06F 17/30864
USPC ......................... 707/769, 705, 758; 709/224
See application file for complete search history.

(56) References Cited

U.S. PATENT DOCUMENTS

| | | | |
|---|---|---|---|
| 7,930,290 B2 * | 4/2011 | Farouki ........................ 707/710 |
| 7,941,546 B2 * | 5/2011 | Rice et al. ..................... 709/227 |
| 8,072,954 B2 * | 12/2011 | Shen et al. .................... 370/338 |
| 8,261,193 B1 * | 9/2012 | Alur et al. ..................... 715/742 |
| 8,290,926 B2 * | 10/2012 | Ozzie et al. ................... 707/708 |
| 2002/0038308 A1 * | 3/2002 | Cappi ........................ 707/104.1 |
| 2003/0004959 A1 * | 1/2003 | Kotsis et al. .................. 707/100 |
| 2009/0077040 A1 * | 3/2009 | Moore .............................. 707/3 |
| 2009/0083058 A1 * | 3/2009 | Beringer et al. .................. 705/1 |
| 2009/0089225 A1 * | 4/2009 | Baier et al. ...................... 706/12 |
| 2009/0172511 A1 * | 7/2009 | Decherd et al. ............... 715/207 |
| 2009/0249231 A1 * | 10/2009 | Mohr ............................ 715/763 |
| 2009/0265760 A1 * | 10/2009 | Zhu et al. .......................... 726/3 |
| 2009/0287740 A1 * | 11/2009 | Banerjee et al. ............ 707/104.1 |
| 2010/0037157 A1 * | 2/2010 | Chang et al. .................. 715/764 |
| 2010/0064277 A1 * | 3/2010 | Baird et al. .................... 717/120 |
| 2010/0083222 A1 * | 4/2010 | Maximilien et al. .......... 717/110 |
| 2010/0125623 A1 * | 5/2010 | Rice et al. ..................... 709/202 |
| 2010/0125826 A1 * | 5/2010 | Rice et al. ..................... 717/107 |
| 2010/0145946 A1 * | 6/2010 | Conrad et al. ................ 707/736 |
| 2010/0180254 A1 * | 7/2010 | Petschnigg et al. ........... 717/105 |
| 2010/0198787 A1 * | 8/2010 | Robertson et al. ............ 707/634 |
| 2010/0333154 A1 * | 12/2010 | Dasher et al. ................... 725/98 |
| 2011/0022955 A1 * | 1/2011 | Gilfix ............................ 715/702 |

(Continued)

*Primary Examiner* — Miranda Le
(74) *Attorney, Agent, or Firm* — Steven M. Greenberg, Esq.; CRGO Law

(57) ABSTRACT

Embodiments of the present invention provide a method, system and computer program product for the on-demand generation of correlated collections of mashable data from distributed, heterogeneous data sources. In an embodiment of the invention, a method for on-demand generation of correlated collections of mashable data from distributed, heterogeneous data sources is provided. The method includes receiving a request for a data feed from a widget in a mashup rendered in a content browser executing in memory of a computer. The method further includes inspecting a virtual database of data aggregated from different data sources over a computer communications network to locate data requisite to returning the data feed to the widget in the mashup. The method yet further includes querying the data of the virtual database to produce the data feed. Finally, the method includes returning the data feed in the format specified to the widget in the mashup.

10 Claims, 2 Drawing Sheets

(56) References Cited

U.S. PATENT DOCUMENTS

| | | | |
|---|---|---|---|
| 2011/0040805 A1* | 2/2011 | Carter et al. | 707/808 |
| 2011/0078594 A1* | 3/2011 | Guertler et al. | 715/763 |
| 2011/0093435 A1* | 4/2011 | Zha et al. | 707/639 |
| 2011/0179066 A1* | 7/2011 | Cardno et al. | 707/769 |
| 2011/0202149 A1* | 8/2011 | Baier et al. | 700/83 |
| 2011/0209069 A1* | 8/2011 | Mohler | 715/744 |
| 2011/0246444 A1* | 10/2011 | Jenkins et al. | 707/711 |
| 2011/0320603 A1* | 12/2011 | Turski et al. | 709/226 |
| 2012/0144335 A1* | 6/2012 | Abeln et al. | 715/771 |
| 2012/0150792 A1* | 6/2012 | Yassin et al. | 707/602 |
| 2012/0218254 A1* | 8/2012 | Abeln | 345/419 |
| 2012/0231441 A1* | 9/2012 | Parthasarathy et al. | 434/362 |

* cited by examiner

US 9,053,184 B2

ON-DEMAND GENERATION OF CORRELATED COLLECTIONS OF MASHABLE DATA FROM DISTRIBUTED, NON-HOMOGENEOUS DATA SOURCES

BACKGROUND

1. Field

The present invention relates to the field of content aggregation and more particularly to data feed management and utilization in content aggregation.

2. Description of Related Art

The advent of the Internet has given rise to new modes of computing unimaginable previously. Whereas personal computing prior to the widespread use of the Internet had been limited largely to the execution of computer programs in a single computing device, the advent of the Internet has enabled a multitude of different computing paradigms ranging from remote information gathering through the World Wide Web (the "Web") to hosted computing applications managed by service providers and accessible to remote users over the Internet. Consequently, substantial cost savings have been realized in deploying host computing applications utilizing Web page technologies.

Despite the cost savings afforded by Web page technologies formatted in the hypertext markup language (HTML), the static nature of basic Web site views to information will be recognized as overly restrictive given the ubiquitous nature of Internet access to information common today. Thus, the outmoded nature of static Web site access to information has resulted in the development of content aggregation technologies such as portal computing aggregating different portlet views in a single page. In portal computing, different static Web site views—portlets—can be selected for appearance in a single page—the portal. User interface events received for one portlet in the portal are directed to the portlet, but a re-rendering of one portlet results in the update of the other portlets in the portal. Of import, while the flexibility afforded by portal technologies reflects a dramatic improvement over a singular static Web view of data, portal technologies still do not provide the flexibility requisite for true data analysis.

In this regard, lists remain the dominant mode of presenting data in a Web page. The data presented in the lists can either be static text extracted from a data store or generated dynamically by program code, or received through a "feed" as it is well known in the art. Feeds provide some flexibility as feeds generally deliver data in extensible markup language (XML) format. Even still, the flexibility necessary to visualize data scenarios of even moderate complexity is not present in a general list or feed. In fact, to present in a Web page a data set of one viewpoint that differs from a contemporaneously viewed data set of a different viewpoint requires a new retrieval of the desired data set from the data source. For applications that require multiple variations of the same basic data, an undesirably large number of requests to the original data source can result in performance degradation of an entire system.

To alleviate the undesirable strain on network resources resulting from repeated requests to retrieve different data sets to visualize different viewpoints of data, some designs call for a generic, encompassing query to retrieve a larger than necessary data set. Only subsequently, a filter can be applied to the encompassing data set to reduce the data to a desired viewpoint. However, performing strategic filtering on a retrieved data set presents compatibility problems in a mashup environment. In web development, a mashup is a web page or application that uses and combines data, presentation or functionality from two or more sources to create new services. Of note, to the extent the mashup environment is a performance critical environment, data set filtering can be undesirable and incompatible with the inherent interactivity associated with the mashup environment.

BRIEF SUMMARY

Embodiments of the present invention address deficiencies of the art in respect to the retrieval, correlation and visualization of data in a mashup environment and provide a novel and non-obvious method, system and computer program product for the on-demand generation of correlated collections of mashable data from distributed, heterogeneous data sources. In an embodiment of the invention, a method for on-demand generation of correlated collections of mashable data from distributed, heterogeneous data sources is provided. The method includes receiving a request for data with specified filters and data format from a widget in a mashup rendered in a content browser executing in memory of a computer. The method further includes inspecting a virtual database of data aggregated from different data sources over a computer communications network to locate data requisite to returning the data feed to the widget in the mashup. The method yet further includes querying the data of the virtual database to produce the data feed. Finally, the method includes returning the data feed to the widget in the mashup.

In another embodiment of the invention, a content aggregation data processing system is configured for on-demand generation of correlated collections of mashable data from distributed, heterogeneous data sources. The system includes a host server with at least one processor and memory and configured for communicative coupling to different data sources and also to different computers over a computer communications network. Each of the computers includes a content browser rendering a mashup of widgets. The system additionally, includes a virtual database disposed in the memory of the host server and providing an application programming interface (API) supporting query operations against data stored in the virtual database. Finally, the system includes a correlation engine executing in the memory of the host server and coupled to the virtual database. The correlation engine includes program code that when executed by the host server retrieves data requisite to respond to a data feed request from a widget in a mashup from at least one of the data sources, and stores the retrieved data in the virtual database for querying through the API by a feed generator for the widget in the mashup.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION

Embodiments of the invention provide for on-demand generation of correlated collections of mashable data from distributed, heterogeneous data sources. In accordance with an embodiment of the invention, a request for data can be received from a widget in a mashup rendered in a content browser executing in a computer. In response to the request, a virtual database of previously generated data for the mashup can be inspected in an attempt to locate the requested data. To the extent the data cannot be located in the virtual database, a correlation engine can be directed to retrieve the data from one or more data sources disposed across a computer communications network into the virtual database.

Subsequently, a query to satisfy the request for the data can be constructed and executed against the virtual database by a feed generator. The query may include parameters that indicate how the content should be filtered and the format in which the result should be delivered. The result of the query can be formatted according to a specified output format and returned to the widget. The generator may choose to cache the result of the query to further improve response performance. Subsequent requests for data can be satisfied against the virtual database by one or more feed generators by constructing a suitable query for the request and executing the query against the virtual database. In this way, different queries providing different views of the data in the virtual database can be performed and streamed into the mashup without requiring the repetitive and inefficient repeated generation of data requests to the data sources across the computer communications network.

Figure 1:
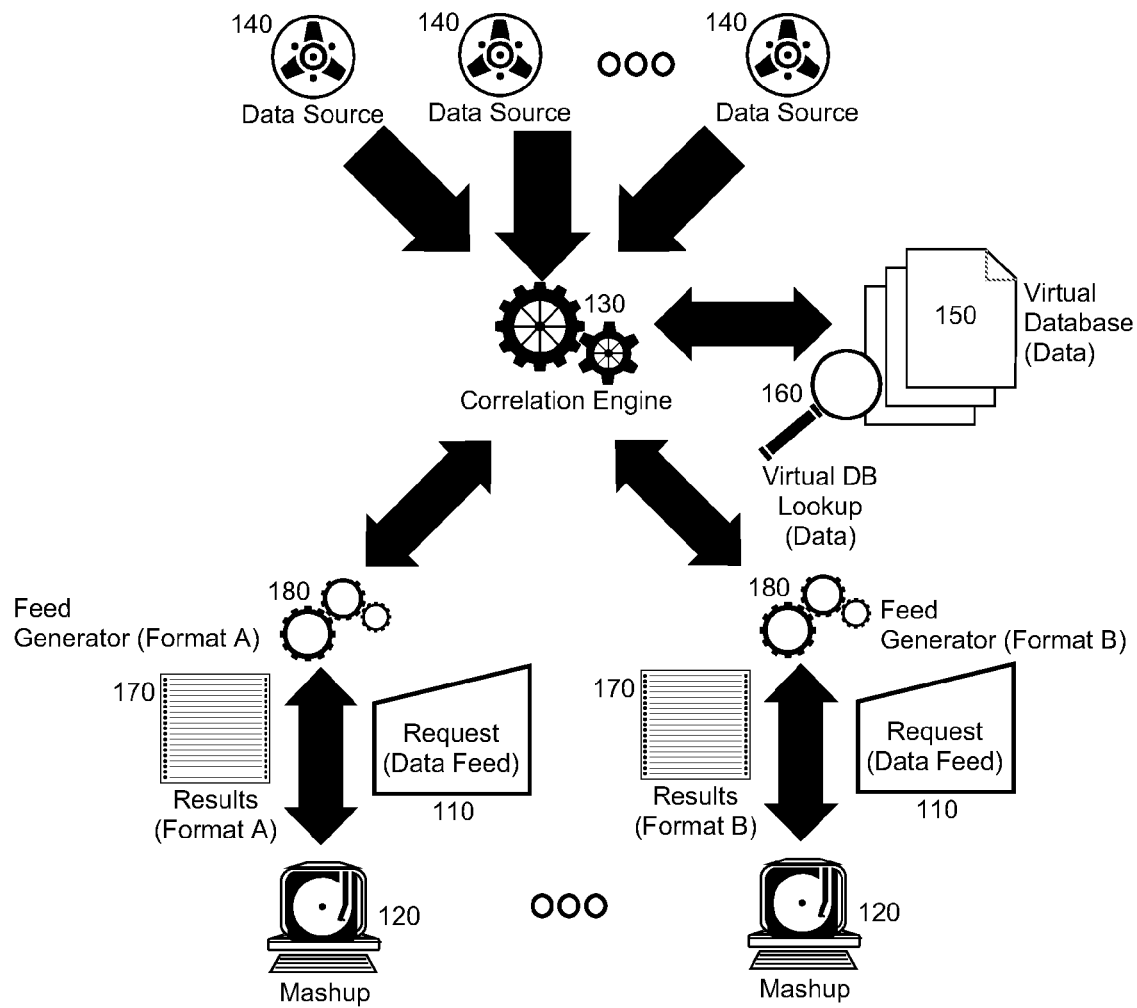
FIG. 1 is a pictorial illustration of a process for on-demand generation of correlated collections of mashable data from distributed, heterogeneous data sources.

In further illustration, FIG. 1 is a pictorial illustration of a process for on-demand generation of correlated collections of mashable data from distributed, heterogeneous data sources. As shown in FIG. 1, different mashups 120 in different content browsers of different computers can issues data requests 110 to a corresponding feed generator 180. The feed generator 180 in turn can look up the requested data specified in the data request 110 in a virtual database 150 of previously aggregated data. In this regard, the virtual database 150 can range from a relational database to a data structure stored in memory subject to the caveat that in any circumstance, an API can be provided for the virtual database 150 through which different queries can be executed against data in the virtual database 150 to produce a requested result set.

In any event, if the requested data cannot be located in the virtual database 150, a correlation engine 130 can retrieve the requested data from one or more data sources 140 and the correlation engine 130 thereafter can place the retrieved data into the virtual database 150. Subsequently, the feed generator 180 can issue a query 160 against the virtual database 150 to retrieve the data of the request 110. Finally, the feed generator 180 can generate a particularly formatted result set 170 for return and rendering in the mashup 120. For instance, the formatted result set 170 can be formatted in a particular markup language such as SVG, HTML or XML.

Figure 2:
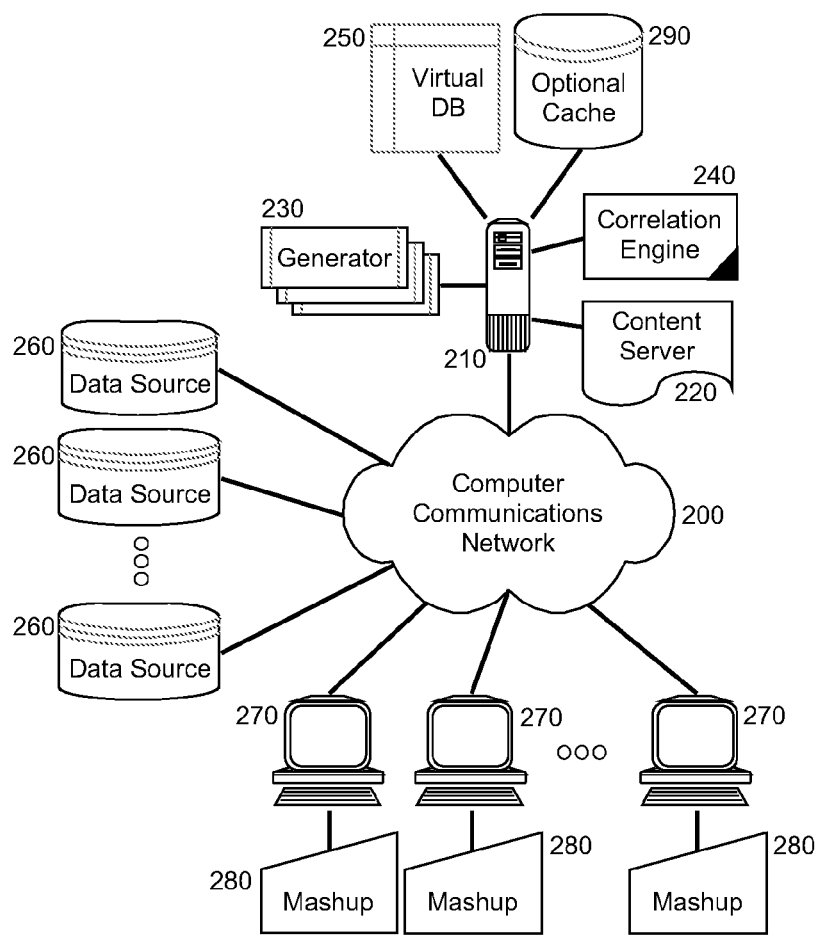
FIG. 2 is a schematic illustration of a content aggregation data processing system configured for on-demand generation of correlated collections of mashable data from distributed, heterogeneous data sources; and, FIG. 3 is a flow chart illustrating a process for on-demand generation of correlated collections of mashable data from distributed, heterogeneous data sources.

The process described in FIG. 1 can be implemented in a content aggregation data processing system. In yet further illustration, FIG. 2 schematically shows a content aggregation data processing system configured for on-demand generation of correlated collections of mashable data from distributed, heterogeneous data sources. The system can include a host server 210 with at least one processor and memory configured for communicative coupling to multiple different computers 270 over a computer communications network 200. The host server 210 can support the operation of a content server 220 serving content in the form of a mashup 280 to different content browsers in the computers 270. As it is well known in the art, a mashup 280 is a Web page or application that combines data or functionality from two or more external sources, including data sources 260 to create a new service.

As shown in FIG. 2, multiple different feed generators 230 can be coupled to the host server 210 and configured to respond to data requests from the different mashups 270 by returning requested data feeds to corresponding requesting ones of the mashups 270, for example through really simple syndication (RSS) feed or representational state transfer (REST) technologies. Of note, a correlation engine 240 also can be coupled to the host server 210. The correlation engine 240 can be a programmatic module of computer readable program code that when executed by the host server 210, responds to an initial request for a data feed from a feed generator 230 amongst the feed generators 230 by retrieving the requested data from one or more of the data sources 260.

The resulting data can be placed into a virtual database 250 providing an API exposing different querying services to the feed generators 230 in order to support different queryable views of the data. In this way, for subsequent requests by any of the feed generators 230 for different views of the data, the data need not be retrieved from the data sources 260 again. Rather, the data already present in the virtual database 250 can be aggregated and filtered by a specific query to return a desired data feed in a desired format for aggregation into a consuming one of the mashups 280. Optionally, the desired data feed further can be placed into a cache 290 for even more efficient retrieval upon subsequent request by the feed generators 230.

Figure 3:
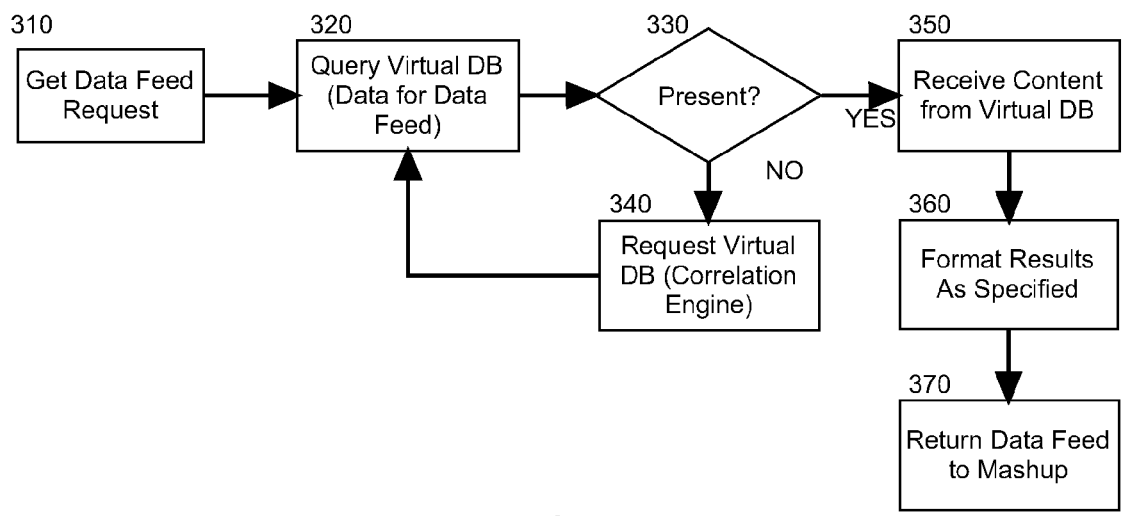

In even yet further illustration of the operation of the content aggregation data processing system, FIG. 3 is a flow chart illustrating a process for on-demand generation of correlated collections of mashable data from distributed, heterogeneous data sources. Beginning in block 310, a data request can be received from a widget in a mashup for data in a particular format, such as a format compliant with a specific markup language. In block 320, the virtual database can be inspected to determine in decision block 330 whether or not the requested data is already present and accessible in the virtual database. If not, in block 340 the data requisite to the request can be retrieved from one or more data sources and placed into the virtual database. Subsequently, the data can be located upon a new inspection of the virtual database in block 320 and in block 350, the query results can be received from the virtual database to produce the requested data feed. In block 360, the resultant data feed can be formatted according to the initial request and in block 370, the formatted data feed can be returned to the mashup.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radiofrequency, and the like, or any suitable combination of the foregoing. Computer program code for carrying out operations for aspects of the present invention may be written in any combination of one or more programming languages, including an object oriented programming language and conventional procedural programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. In this regard, the flowchart and block diagrams in the Figures illustrate the architecture, functionality, and operation of possible implementations of systems, methods and computer program products according to various embodiments of the present invention. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. A method for on-demand generation of correlated collections of mashable data from distributed, heterogeneous data sources, the method comprising:
   receiving an initial request for a data feed from a feed generator for a widget disposed in a mashup rendered within a Web browser;
   retrieving data for the requested data feed from at least one of the data sources over a computer communications network and placing the retrieved data into a virtual database providing an application programming interface (API) exposing different querying services to different feed generators; and
   upon receiving a subsequent request for a data feed of a different view of the data from a different feed generator for a different widget disposed in the mashup rendered within the Web browser, querying the virtual database to obtain the data to produce the requested data feed without retrieving the data from the data sources.

2. The method of claim 1, further comprising formatting the data feed before returning the data feed to the widget in the mashup in a format consistent with a specified markup language.

3. The method of claim 1, further comprising:
   caching the data feed in a cache; and,
   satisfying subsequent requests for the data feed from the cache and not the virtual database.

4. A content aggregation data processing system configured for on-demand generation of correlated collections of mashable data from distributed, heterogeneous data sources, the system comprising:
   a host server with at least one processor and memory and configured for communicative coupling to a plurality of data sources and also a plurality of different computers over a computer communications network, each of the computers comprising a content browser rendering a mashup of widgets, the host server being configured to:
   receive an initial request for a data feed from a feed generator for a widget disposed in a mashup rendered within a Web browser;
   retrieve data for the requested data feed from at least one of the data sources over the computer communications network and place the retrieved data into a virtual database disposed in the memory of the host server, the virtual database providing an application programming interface (API) exposing different querying services to different feed generators; and
   upon receiving a subsequent request for a data feed of a different view of the data from a different feed generator for a different widget disposed in the mashup rendered within the Web browser, query the virtual database to obtain the data to produce the requested data feed without retrieving the data from the data sources.

5. The system of claim 4, wherein the data feed is provided to the widget for the mashup by way of a representational state transfer (REST) service.

6. The system of claim 4, wherein the data feed is provided to the widget in the mashup by way of a really simple syndication (RSS) feed.

7. The system of claim 4, further comprising a cache into which the data feed is stored for subsequent retrieval in response to a similar data feed request.

8. A computer program product for on-demand generation of correlated collections of mashable data from distributed, heterogeneous data sources, the computer program product comprising:
   a computer readable storage medium having computer readable program code embodied therewith, the computer readable program code comprising:
   computer readable program code for receiving an initial request for a data feed from a feed generator for a widget disposed in a mashup rendered within a Web browser;
   computer readable program code for retrieving data for the requested data feed from at least one of the data sources over a computer communications network and placing the retrieved data into a virtual database providing an application programming interface (API) exposing different querying services to different feed generators; and
   computer readable program code for upon receiving a subsequent request for a data feed of a different view of the data from a different feed generator for a different widget disposed in the mashup rendered within the Web browser, querying the virtual database to obtain the data to produce the requested data feed without retrieving the data from the data sources.

9. The computer program product of claim 8, further comprising computer readable program code for formatting the data feed before returning the data feed to the widget in the mashup in a format consistent with a specified markup language.

10. The computer program product of claim 8, further comprising:
    computer readable program code for caching the data feed in a cache; and, computer readable program code for satisfying subsequent requests for the data feed from the cache and not the virtual database.

* * * * *